Jan. 14, 1969 M. G. PEARSON 3,422,434

POSITION INDICATORS FOR USE IN MOBILE CRAFT

Filed Nov. 21, 1966 Sheet 1 of 3

3,422,434
POSITION INDICATORS FOR USE IN MOBILE CRAFT
Michael Geoffrey Pearson, London, England, assignor to Decca Limited, London, England, a British company
Filed Nov. 21, 1966, Ser. No. 595,674
U.S. Cl. 343—112 14 Claims
Int. Cl. G01s 3/02

ABSTRACT OF THE DISCLOSURE

This specification discloses apparatus for the automatic display on any one of a number of charts of the position of a craft as determined by any one of a number of VOR/DME stations. The various charts are arranged in succession along a strip which can be moved to position one or part of a chart in a viewing position, a marker being movable transversely to the chart strip across the viewing position. The chart strip and marker are driven by servo means from a computer which determines the chart co-ordinates of the craft position from VOR/DME range and bearing information utilizing chart scale, location and orientation data sensed from the chart strip and VOR/DME station data from a VOR/DME data store. This VOR/DME data store contains information about a number of stations which might be used for the chart in the viewing position, the information being fed into the store from the chart strip as each individual chart is brought into the viewing position.

Figure 1:
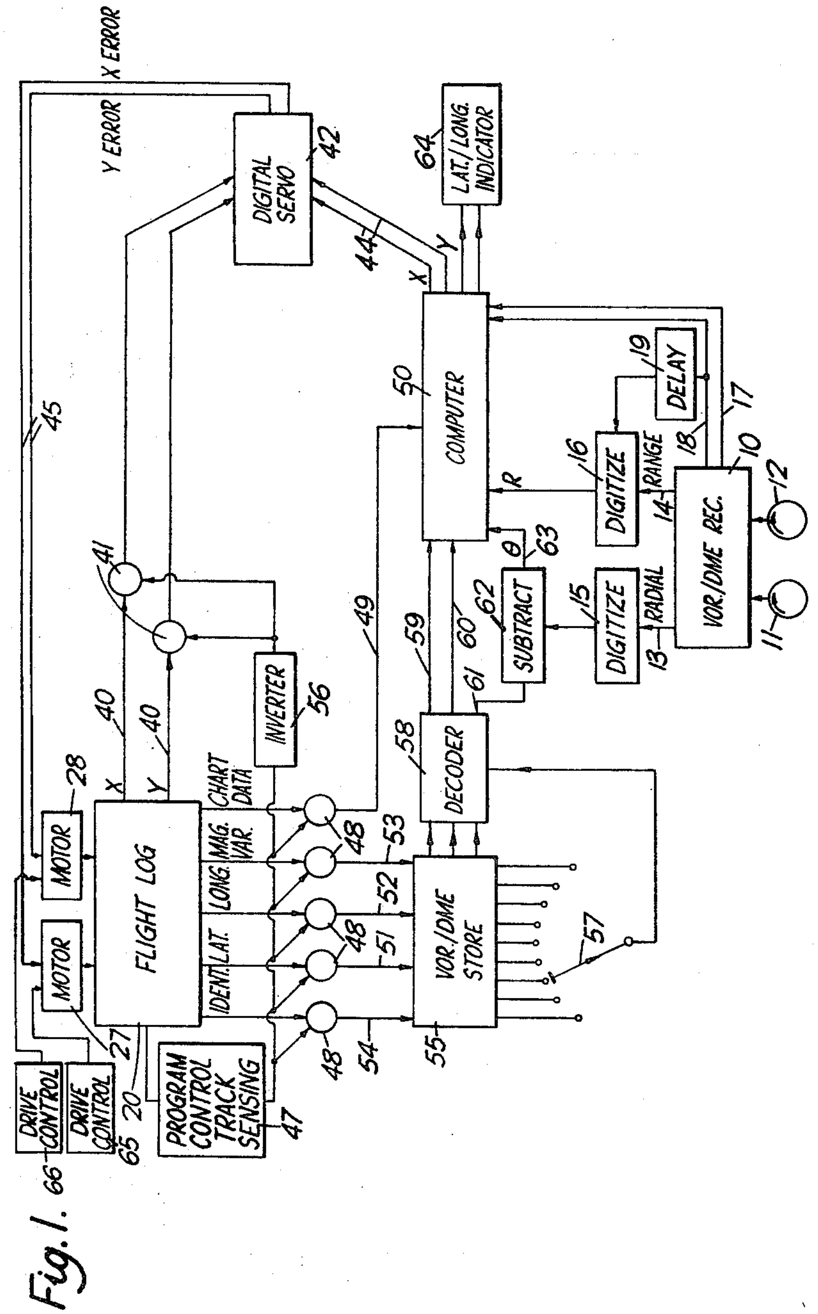

This invention relates to position indicators for use in mobile craft, particularly aircraft, to indicate the position of the craft as determined by a radio position fixing system of the kind (referred to hereinafter as a radio position fixing system of the kind described) in which equipment on the craft determines the range and bearing of the craft from a selected ground station.

At the present time, one of the internationally approved radio systems for determining the position of aircraft is that known as VOR/DME. In this system, a receiver on the aircraft can be tuned to a frequency employed by a selected ground station and then, by the comparison of phase of certain signals, information can be obtained representative of the range and bearing of the aircraft from that ground station. These stations are normally located on the airways, frequently at turning points in airways and the practice is for an aircraft to tune to the nearest station along the airway and to fly away from or towards that station with the appropriate heading corresponding to the direction of the airway. The invention is applicable however, not only to VOR/DME but more generally to any radio position fixing system providing information of range and bearing from selected fixed points.

According to this invention, in a mobile craft having a receiver for radio position fixing system of the kind in which equipment on the craft determines the range and bearing of the craft from a selected ground station, there are provided, in combination, data storage means storing information representative of the positions of a plurality of ground stations of said radio position fixing system, a chart position indicator for indicating, on a chart, the position of a craft in accordance with input data fed to the chart position indicator, a computer, means for feeding range and bearing information from said receiver to said computer, a selector switch arranged to feed information about the position of a selected ground station from said data storage means to said computer, which computer is arranged to provide said input data for the chart position indicator in accordance with the inputs from the receiver and the data storage means. By this construction, the position of the chart is automatically indicated on a chart. If it is desired or necessary to switch the receiver from one ground station to another, no change of chart is required since the computer converts the positional information from the receiver into chart coordinates taking into account the location of the selected ground station. The user can thus use for example any one of a number of ground stations while still employing a single chart; this is particularly advantageous in systems where the track of the craft is recorded on the chart of the chart position indicator.

An aircraft may fly over a lengthy route in the coverage regions of many ground stations. The chart position indicator is preferably arranged to operate with a number of different charts covering different parts of the route and possibly to different scales. For this purpose, the chart position indicator conveniently comprises a series of charts arranged in strip form with drive means for traversing the chart strip in the direction of its length and for traversing a marker transversely to the length of the chart strip and the chart strip may then carry, between successive charts, digital information representing the scale and the geographical location of the charts, sensing means being provided for sensing the information as a chart is moved into a viewing position and for feeding this information into the computer for computing the chart coordinates of the position of the craft. Changing of the charts can be effected automatically when the marker reaches the edge of a chart or on selection by the operator; when any new chart is moved into the viewing position, the necessary chart constants are automatically sensed and fed to the computer so that the computer can drive the marker in the appropriate coordinate reference system for the new chart.

Most conveniently the data about the ground stations to be employed with each chart is stored in digital form on the chart strip in the regions between adjacent charts and sensing means are provided for sensing this data and transferring it to said data storage means as the chart strip is traversed to bring a chart into a viewing position. Thus the data storage means need only have the capacity for storing data relating to the few ground stations which may be utilized when the craft is in the geographical region covered by one chart, i.e., the stations located in that region and possibly just outside it. The selection of a chart automatically feeds into the data storage means the appropriate data about any stations which may be used in the geogrphical region of that chart.

Preferably the chart has digital markings along its length, sensing means being provided for sensing said markings to give a digital output representative of the position of the chart strip and the means for traversing said marker has associated digital markings and sensing means for giving a digital output representative of the position of the marker; the drive means for the chart strip and marker may then comprise means comparing the digital signals representative of the position of the chart strip and marker with output signals from said computer representing the co-ordinate position on the chart of the craft to produce error signals and drive motors responsive to said error signals for driving the chart strip and marker in the directions to minimize the error signals. This system forms a closed loop servo drive for the chart position indicator. The system can readily be made self-setting over the whole region of a chart, i.e., if the marker is located anywhere on the chart, the error signals will cause the chart and marker to be driven to bring the marker to the correct position on the chart indicating the geographical location of the craft. Thus in chart changing, whether automatic or manually controlled, it is merely necessary to bring the required chart into the viewing position and the servo system will then set the chart strip and marker correctly. Manually controlled, e.g. push-button controlled, fast drives may be provided for selections of a required chart.

The same sensing means, which are typically photocells, may be used for sensing the data about ground stations stored on the chart strip in the regions between adjacent charts and the digital markings representative of the position of the strip, the chart strip having a program control track and means being provided responsive to the program control track for feeding the output from said sensing means to the data storage means or the drive means as appropriate.

VOR/DME systems are normally arranged to give bearing information as a magnetic bearing i.e. a bearing from magnetic north, and, in this case, the data storage means may be arranged to store information not only representative of the positions of the ground stations but also representative of the magnetic variation to be used to correct the bearing information for each station. The computer may then include means for correcting bearing information from the receiver using the appropriate magnetic variation from said data storage means before computing the position of the vehicle in cartesian coordinates.

In the simplest form, the selector switch may be a manually operable switch and the chart, in that case, can carry information visually indicating the frequencies for tuning the received of the radio position fixing system. The operator then, to change from use of one ground station to another, would have to re-tune the receiver in the conventional way and set the selector switch to the position corresponding to the selected station. In a preferred construction, however, the data storage means are arranged to store information representative of the frequencies for tuning the receiver of the radio position fixing system and automatic tuning means are provided, controlled by the selector switch, for tuning the receiver to the selected station.

The computer may include selector means comparing the position of the craft determined by the radio position fixing system with the positions of the ground stations as stored in said data storage means and for driving the selector switch, in accordance with the comparison, to select the appropriate ground station. Thus the computer can determine when it is appropriate to change from one ground station to another and effect this change automatically without any intervention of the operator. The marker would continue to move with respect to the same chart to indicate the geographical position of the craft. Preferably indicator means would be provided to indicate to the user which ground station is being employed; e.g. the stations may be numbered on the chart and an appropriate lamp illuminated to indicate the number of the station being employed.

Thus according to a further aspect of the present invention, in a moble craft having a receiver for a radio position fixing system of the kind in which a receiver on the craft determines the range and bearing of the craft from a selected ground station, there are provided, in combination, data storage means storing information representative of the positions of a plurality of ground stations of the radio position fixing system, and computing means operative to determine the distance between the position of the craft, as determined by said receiver using one ground station, and another selected ground station.

Figure 2:
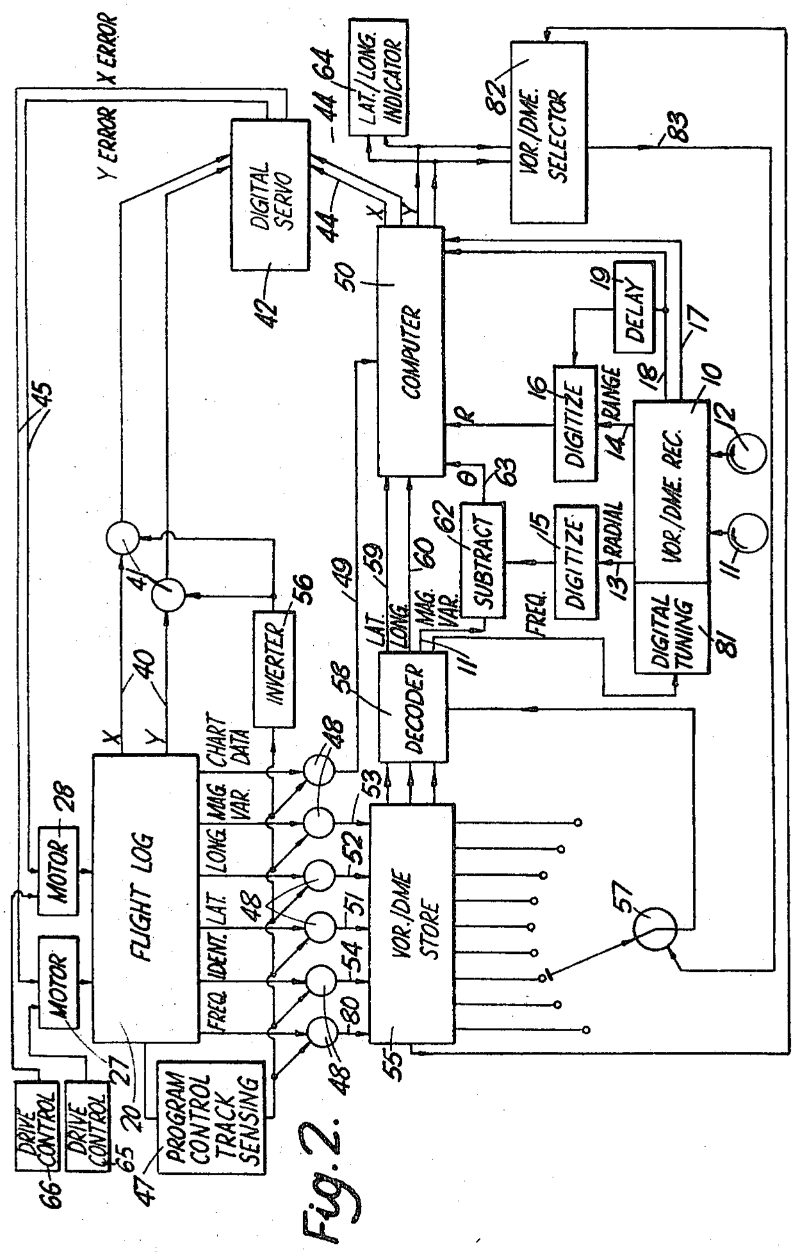
Figure 3:
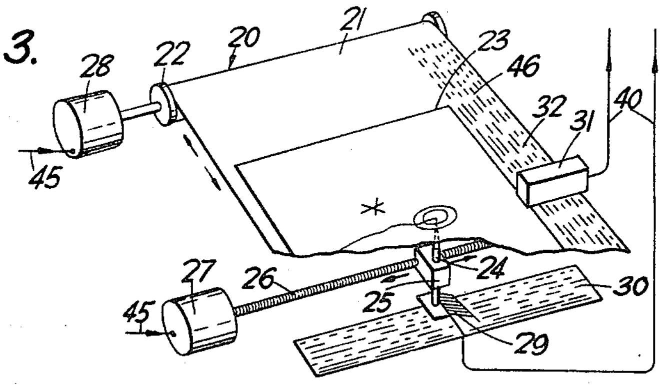

The following is a description of two embodiments of the invention, reference being made to the accompanying drawings in which:

FIGURES 1 and 2 are each a block diagram illustrating apparatus for use in an aircraft in conjunction with VOR/DME stations for position fixing; and FIGURE 3 is a diagram illustrating in further detail the chart position display equipment used in the apparatus of FIGURES 1 and 2.

FIGURE 1 illustrates a simple embodiment of the invention using a VOR/DME receiver 10 which is tuned manually by controls 11, 12 to provide a bearing output information at 13 and distance information on lead 14. The bearing output information, which is commonly referred to as the "VOR radial" is a bearing with respect to the magnetic north and, in conventional VOR/DME receivers, is available as a synchro output. This is digitized by means of a digitizer 15, typically a shaft encoder, giving a binary digital output in gray code. The DME distance information on lead 14 is also digitized using a digitizer 16. The method of digitizing the DME output will depend on the type of receiver; for example with some receivers, there is an output potentiometer which gives a coarse distance indication and a "units" synchro for the fine measurement. The "warning flag" outputs of the VOR/DME receiver on leads 17, 18 indicate when reliance is to be placed on memory. The DME warning flag signal on lead 18 is fed via a delay unit 19 to the digitizer 16 to protract the flag warning condition after normal DME functioning has been restored for several seconds to give time for the DME search to be completed; this is to avoid undue mechanical wear in the digitizer 16 in attempts to follow the rapid and continuous movements involved in the search procedure.

The position of the craft, as determined by the VOR/DME information, is to be displayed on a chart in chart position indicating apparatus 20 (FIGURE 1). This apparatus is shown in further detail in FIGURE 3 and comprises a chart strip 21 extending between two spools of which one is shown at 22. This strip carries a series of charts, such as chart 23; in the particular embodiment illustrated, the chart strip is of transparent polyester film so that a position can be indicated on the chart by a marking stylus 24 located beneath the chart. The marking stylus typically comprises a solenoid-operated pecker acting upon a typewriter ribbon, a glass cursor being provided in front of the chart to lead the eye to the stylus and to form a surface against which the stylus may strike the ribbon onto the chart. This marking stylus 24 is carried on a member 25 which can be traversed across the chart by means of a lead screw 26 driven by a motor 27. The chart strip can be moved lengthwise by motors driving the two spools; one such motor is indicated at 28 and one or other of the spools is driven according to direction of movement required. The marker can thus be moved relatively to a chart in rectangular cartesian co-ordinates by means of the motors 27, 28. The transverse movement of the marker by the motor 27 will be referred to hereinafter as movement in the X direction while movement of the chart strip by the motor 28 will be referred to as movement in the Y direction.

The charts may be to any desired scale and may be oriented on the chart strip as required; for example it may in some cases be desired to have a long chart covering an airway and large scale charts of the neighborhood of airports. The various charts in a strip may thus have different geographical orientations and/or scales. The portion of the chart strip extending between the two spools 22 constitutes the part which can be viewed; this may be the whole or only part of a chart.

The transverse movement of the marker in the X direction is controlled by a closed loop servo system which requires a feedback of the marker X coordinate. For this purpose the member 25 carries wipers 29 traversing a digitally encoded contact strip 30. For the Y coordinate system, photo-electric cells 31 sense digital markings 32 on the strip alongside each chart to give a feedback of the Y coordinate of the chart position.

Referring again to FIGURE 1, the X and Y coordinates representative of the position of the marker on the chart are fed out on leads 40 through gates 41, to be referred to later, to a digital servo 42. In this digital servo these coordinates are compared with the coordinate values of the required position of the marker on leads 44 to give X and Y direction error voltages on leads 45. These are D.C. voltages having a polarity representing the sense of the error and are used to drive the motors 27, 28 in the directions to minimize any such error voltages. The digital servo and the coordinate feedback system thus form a closed loop causing the marker and chart to be set to indicate the chart position corresponding to the inputs on leads 44.

In the region of any one chart, it may be required to make use of any one of a number of different VOR/DME ground stations. In the particular embodiment now being described, provision is made for using up to nine different stations for any chart. These stations may be located in the geographical area covered by the chart or may be outside that area. It will be readily apparent from the following description, however, that provision may be made for utilizing any desired number of stations. With different charts, further stations may be employed. On the chart strip, between successive charts 23, digital information is recorded, as shown at 46 in FIGURE 3, representative of the geographical locations of all the VOR/DME stations which may be used when the craft is in the region of the adjacent chart. Also recorded at 46 is information representing the magnetic variation to be used in correcting the bearing information from each of these stations and information, referred to hereinafter as chart constants, representing the chart scale, orientation and geographical location of the adjacent chart. For each chart, this information is marked at both ends of the chart in a position where it can be sensed by the photocells 31 as the chart is being moved into the viewing position. The chart strip also has a program control track sensed by one of the photo-cells to indicate whether the information being sensed is the Y coordinate of the chart location or the chart constant and station location information. The output from the program control track sensor at 47 (FIGURE 1) is used, when the chart constant station location information is available from the photo-cells 31, to open gates 48 to feed the outputs from these photocells to their required destinations. The chart constants are fed, as indicated at 49 to a coordinate conversion computer 50. The information about the VOR/DME stations consisting of their latitude, longitude and magnetic variation on leads 51, 52 and 53 respectively, together with a station identification number on lead 54 are fed to a VOR/DME store 55. The station identification number is a number between 1 and 9 and these numbers are used to identify the nine possible stations which may be employed when the craft is in the geographical region of one chart. The various stations on the chart are marked with these numbers; also, since in this particular equipment the VOR/DME receiver is to be manually tuned, the appropriate frequencies are also marked on the chart. The identification numbers serve to identify the store locations of the information about the various stations in the store 55. The output of the program control track at 47 is also fed through an inverter 56 to open the aforementioned gates 41 so that these gates 41 are open when gates 48 are closed and vice versa.

When a particular station is to be employed, a selector switch 57 is set to the appropriate station number and, by means of a decoder 58, this causes the information about the latitude, longitude and magnetic variation of the selected station to be fed out on leads 59, 60 and 61 respectively. The magnetic variation information on lead 61 is combined at 62 with the bearing information from the VOR/DME digitizer 15 to correct the latter into a true bearing which is fed at 63 into the coordinate conversion computer 50. The latitude and longitude of the selected station on leads 59, 60 are fed directly to the computer 50 as is also the distance information from the digitizer 16. This computer 50 effects a range and bearing to latitude and longitude coordinate conversion, with appropriate choice of coordinate origin, axes and scales, to give the required X and Y coordinate outputs on the aforementioned leads 44 representing the coordinates of the required position of the marker on the chart, so that the position of the craft is indicated on the chart display. The computer 50 also determines the latitude and longitude of the position of the craft for feeding to a further display 64.

In the apparatus of FIGURE 1, the VOR/DME receiver 10 is tuned manually by the controls 11, 12. In this embodiment, the selector switch 57 may be a manual switch; the various switch positions would be numbered to correspond to the station identification numbers. The operator therefore would tune the VOR/DME receiver 10 to the appropriate station and set the selector switch 57 to the number corresponding to that station. The computer 50 would thus operate automatically to control the position of the marker lamp and chart strip so that the marker indicates on the chart the geograpihcal location of the craft. If it is desired or necessary to switch to another VOR/DME station, the receiver is retuned or a second receiver switched into operation and the selector switch set to the identification number of the newly selected station. The marker will then automatically take up the chart position determined from the newly selected station. To avoid however any temporary cessation of tracking the craft on the chart position display, the computer may be arranged to operate on a memory of the speed and direction of travel of the craft for the short time of the change-over. The memory may be based on previously determined data but preferably is controlled from airspeed and heading inputs to give a dead-reckoning calculation of change of position during any time period that the radio position fixing information is not available. It will be noted however that any errors in the tracking during such a period operating on memory will be automatically corrected as soon as measured position information is again available as the chart position display is automatically self-setting. The warning flag outputs from the VOR/DME receiver on leads 17 and 18 are also employed also to switch the computer to "memory" operation. Preferably a warning lamp (not shown) is provided to indicate when operation on memory is taking place so that appropriate action can be taken, e.g. selection of a new VOR/DME station, is taken when positional information is not available for any prolonged period.

It will be particularly noted that no change of chart is required when a new VOR/DME station is employed. This is particularly advantageous when the stylus 24 is a marking stylus producing a record of the track of the craft as it enables a continuous record to be kept irrespective of the possible change in stations being used. Such a continuous record provides not only an indication of the position of the craft but also shows further valuable information. For example, if a pilot of an aircraft wishes to follow any predetermined track, straight or curved, drawn on the chart, the recorded trace shows the rate at which the aircraft is approaching the desired track as well as its displacement from the track thereby improving precision in track keeping and avoiding hunting about the desired track.

A chart change can be made at any time. The new chart has merely to be brought into the viewing position. Manually operable controls 65, 66 (FIGURE 1) are provided for feeding drive signals to the motors 27, 28 and operation of the control 66 for the Y direction drive, which preferably gives a fast drive, enables any chart to be brought into the viewing position. As the chart comes into position, the appropriate chart constants are fed into the computer 50 and the VOR/DME station data is fed into the store 55. Preferably the charts in a strip are arranged so that, when the boundary of a chart is reached making a chart change necessary, the VOR/DME station used in that boundary region will have the same identification number on the next chart so that no operation of the selector switch 57 is required. Since the marker position control forms a self-setting closed loop servo system, it is merely necessary to bring a chart into the viewing position; provided the marker is somewhere under the chart, the control system will then operate to drive the marker and chart strip in the X and Y directions respectively to bring the marker to the correct position relative to the chart indicating the geographical location of the craft. Chart changing may be effected automatically by the computer 50 when the craft position reaches the edge of a chart.

If, in any changeover of chart or station selection, the receiver 10 is tuned to a station different from that selected by the selector switch 57, there will in general be a gross disparity in the computed position of the craft compared with the previous position. The computer is preferably arranged, in the event of any such disparity, to operate on memory until the correct station is selected.

Provision may be made for feeding an altitude input into the computer to enable correction to be made for the error in ground position due to the fact that the DME equipment determines the slant range and not the range along the ground. The altitude input may be obtained from an altimeter with a digital altitude transducer.

FIGURE 2 illustrates apparatus generally similar to that of FIGURE 1 but provision is made for automatically selecting and tuning the receiver to the appropriate VOR/DME station and for automatic operation of the selector switch. In FIGURE 2 the same reference characters are used as in FIGURE 1 to indicate corresponding components and mention will only be made of the distinctive features of the apparatus of FIGURE 2. In the apparatus of FIGURE 2, the information stored on the chart strip between the successive charts includes not only the geographical position and magnetic variation for each VOR/DME station but also the frequencies. This information is fed at 80 into the VOR/DME store 55. The selector switch 57 feeds the frequency of the selected station to an automatic tuner 81 for the VOR/DME receiver; this receiver preferably is digitally tuned. To effect automatic selection of the appropriate ground station, the position of the craft, in the form of the latitude and longitude output from the computer 50, is fed to a VOR/DME selector 82. This selector compares the position of the craft with the positions of the various stations as stored in the store 55 and selects the appropriate station, usually the nearest station. The selector 82 may be arranged however to ignore certain stations, e.g. stations which have been notified as being "off the air," or stations giving a flag alarm (VOR/DME stations radiate a signal providing at the aircraft what is known as a "flag alarm" under certain conditions, e.g. when reception is bad) or stations directly on the track of the aircraft for reasons explained below. The output from the selector 82 is fed at 83 to drive the selector switch 57 to the setting corresponding to the selected station. It will be seen that the receiver 10 will then be automatically tuned to this station and the chart display will then operate to indicate the position of the craft using information from this station.

In both embodiments of the apparatus described above, the chart gives an automatic display of the position and track of the craft. It is readily possible therefore to fly courses which are not radials to or from the ground stations. It is generally preferable to use a ground station which is not on the track of the craft so as thereby to avoid the problems which occur in VOR/DME equipment and other radio systems for determining range and bearing when an aircraft flies over the ground station. In the case of VOR/DME, there is a "cone of silence" above the ground station where no position fixing information from that station is available. However, the computer 50 can continue tracking the craft, updating the position in accordance with a previously determined speed and track or by dead-reckoning using the airspeed indicator and compass heading, possibly with a previously computed wind speed. Provision may be made automatically to operate in a memory mode whenever the craft is within a predetermined range of the stations being employed. In the arrangement of FIGURE 2, the VOR/DME selector, which may be the same computer as the computer 50 operating on a time sharing basis to effect the separate functions, can be arranged to effect appropriate selection of the ground station to avoid or minimize these problems.

Instead of the fully automatic selection of the ground stations as is obtained with the apparatus of FIGURE 2, it may be adequate in some cases to use a simpler form of comparator comparing the position of the craft, as determined by the computer 50, with the position of a selected one of the VOR/DME stations which has been selected from the store 55 as the next station to be used, an indication being provided when the range to this next station is less than the range from the station in use; this indication tells the operator when to retune the receiver to the next ground station.

It is a requirement in many countries that VOR/DME receivers should be duplicated to provide a safeguard against failure of a receiver. In the apparatus of the present invention, use may be made of the two receivers, one being tuned to the nearest ground station for position fixing and the other being tuned to the next station to be used. In this case, the computer 50 may be arranged to switch automatically from one ground station to the next when the range to the next station becomes less than that from the station in use, the switching being effected in accordance with a comparison of the range outputs from the two receivers. If such automatic switching is employed, means may be provided to ensure that each receiver is tuned and locked to a ground station before it is brought into operation for position fixing.

I claim:

1. In a mobile craft having a receiver for a radio position fixing system of the kind in which equipment on the craft determines the range and bearing of the craft from a selected ground station, the combination of data storage means storing information representative of the positions of a plurality of ground stations of the radio position fixing system, a chart position indicator for indicating, on a chart, the position of the craft in accordance with input data fed to the chart position indicator, a computer, means for feeding range and bearing information from said receiver to said computer, a selector switch arranged to feed information about the position of a selected ground station from said data storage means to said computer which computer is arranged to provide said input data for the chart position indicator in accordance with the inputs from the receiver and the data storage means, and comparison means comparing the position of the craft determined by the radio position fixing system with the positions of the ground stations as stored in said data storage means and driving the selector switch, in accordance with the comparison, to select the appropriate ground station.

2. The combination as claimed in claim 1 wherein the chart position indicator comprises a chart and a marker movable relative to the chart with drive means for separately effecting movement of the indicator relative to the chart in two transverse coordinate directions.

3. The combination as claimed in claim 1 in which the radio position fixing system is a VOR/DME system giving magnetic bearing information and wherein said data storage means are arranged to store information not only representative of the positions of the ground stations but also representative of the magnetic variation to be used to correct the bearing information from each station and wherein said computer includes means for correcting bearing information from the receiver using the appropriate magnetic variation from said data storage means before computing the position of the vehicle in cartesian coordinates.

4. The combination as claimed in claim 1 wherein said data storage means are arranged to store information representative of the frequencies for tuning the receiver of the radio position fixing system and wherein automatic tuning means are provided controlled by the selector switch for tuning the receiver to the selected station.

5. The combination as claimed in claim 1 wherein the chart position indicator comprises a series of charts arranged in strip form with drive means for traversing the chart strip in the direction of its length and for traversing a marker transversely to the length of the chart strip and wherein the chart strip carries, between successive charts, markings constituting digital information representing the scale and geographical location of the charts, sensing means being provided for sensing this information from said markings as a chart is moved into a viewing position and for feeding this information into the computer for computing the chart coordinates of the position of the craft.

6. The combination as claimed in claim 5 wherein data about the ground stations to be employed with each chart is stored in digital form on the chart strip in the regions between adjacent charts and wherein sensing means are provided for sensing this data and transferring it to said data storage means as the chart strip is traversed to bring a chart into a viewing position.

7. The combination as claimed in claim 6 wherein said chart has digital markings along its length, sensing means being provided for sensing said markings to give a digital output representative of the position of the chart strip and wherein the means for traversing said marker has associated digital markings and sensing means for giving a digital output representative of the position of the marker and drive means for the chart strip and marker comprise means comparing the digital signals representative of the position of the chart strip and marker with output signals from said computer representing the coordinate position on the chart of the craft to produce error signals and drive motors responsive to said error signals for driving the chart strip and marker in the directions to minimize the error signals.

8. The combination as claimed in claim 7 wherein the same sensing means are used for sensing the data about ground stations stored on the chart strip in the regions between adjacent charts and the digital markings representative of the position of the strip, the chart strip having a program control track and means being provided responsive to the program control track for feeding the output from said sensing means to the data storage means or the drive means as appropriate.

9. Position display apparatus for use on an aircraft comprising a series of charts arranged in a long strip, chart display means holding said strip and including drive means for traversing the strip lengthwise across a viewing position, a marker movable transversely to the strip across said viewing position, drive means for said marker, a digital data track on said strip cooperating with data sensing means for giving a digital output representative of the lengthwise position of the chart strip, marker sensing means giving a digital output representative of the transverse position of the marker, digital data on said strip between successive charts representative of the geographical location, orientation and scale of an adjacent chart and of the location and magnetic variation of selected VOR/DME stations to be used by an aircraft when in the geographical area covered by that chart, a computer for computing the chart coordinates in cartesian form of the position of the craft from input data representative of the range and bearing from a selected VOR/DME station and the location, orientation and scale of a chart, sensing means sensing the aforesaid digital data on said strip between successive charts as the short strip is traversed to bring a particular chart into said viewing position and feeding into the computer data about the position, orientation and scale of said particular chart to said computer, a VOR/DME station data store, feeds to said VOR/DME data store from said sensing means to feed into the store data from the chart strip about the VOR/DME stations which can be used by an aircraft in the geographical region of the chart being brought into said viewing position, a selector switch coupling said VOR/DME store to said computer to feed to the computer data about a selected one of the VOR/DME stations, digital servo means comparing the cartesian coordinate output from the computer with digital outputs representative of the lengthwise position of the chart strip and the transverse position of the marker respectively from said data sensing means and said marker sensing means, which servo means control the drive means for the chart strip and marker to set the chart strip and marker so that the marker indicates on the chart the geographical position of the craft as determined by said computer, and a VOR/DME selector comparing the positioned coordinates of the craft as determined by said computer with the positions of the various VOR/DME stations stored in said VOR/DME store and automatically controlling said selector switch to select the VOR/DME station to be used in accordance with that comparison.

10. Position display apparatus as claimed in claim 9 in combination with a VOR/DME receiver with digitally controlled tuning means, wherein the data feed into the VOR/DME store includes data representative of the frequencies of the various VOR/DME stations, and wherein the selector switch is arranged to feed the frequency data of the selected station to said tuning means for the receiver.

11. In a mobile craft having a receiver for a radio position fixing system of the kind in which a receiver on the craft determines the range and bearing of the craft from a selected ground station, the combination of data storage means storing information representative of the positions of a plurality of ground stations of the radio position fixing system, computing means coupled to said data storage means to receive stored information therefrom and coupled to said receiver to receive range and bearing information therefrom, said computing means being operative to determine the distance between the position of the craft, as determined by said receiver using one ground station, and another selected ground station, a selector switch to select a ground station to be utilized by said receiver and drive means for said selector switch controlled by said computing means in accordance with said determined distance.

12. The combination as claimed in claim 11 wherein said computing means are arranged to drive chart position indicating apparatus in accordance with the position of the craft determined by the receiver using the selected ground station.

13. The combination as claimed in claim 12 wherein the chart position indicator comprises a series of charts arranged in strip form with drive means for traversing the chart strip in the direction of its length and for traversing a marker transversely to the length of the chart strip and wherein data about the ground stations to be employed with each chart is stored in digital form on the chart strip in the regions between adjacent charts and wherein sensing means are provided for sensing this data and transferring it to said data storage means as the chart strip is traversed to bring a chart into a viewing position.

14. The combination as claimed in claim 13 wherein said data storage means store information representative of the frequencies to which the receiver is tuned and wherein means are provided for automatically tuning the receiver in accordance with the frequency of the selected ground station selected by said selector switch.

References Cited

UNITED STATES PATENTS

| | | | |
|---|---|---|---|
| 2,485,663 | 10/1949 | Rusch et al. | 343—112 |
| 3,113,313 | 12/1963 | Roberts | 343—112 |
| 3,225,350 | 12/1965 | Fernandez | 343—112 |
| 3,249,942 | 5/1966 | Fernandez | 343—112 |

RODNEY D. BENNETT, *Primary Examiner.*

MALCOLM F. HUBLER, *Assistant Examiner.*